(12) United States Patent
Choi

(10) Patent No.: US 12,025,197 B2
(45) Date of Patent: Jul. 2, 2024

(54) BRAKE APPARATUS FOR VEHICLE

(71) Applicant: HYUNDAI MOBIS Co., Ltd., Seoul (KR)

(72) Inventor: Moo Jin Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 403 days.

(21) Appl. No.: 17/583,579

(22) Filed: Jan. 25, 2022

(65) Prior Publication Data

US 2022/0235838 A1    Jul. 28, 2022

(30) Foreign Application Priority Data

Jan. 27, 2021    (KR) .......................... 10-2021-0011496

(51) Int. Cl.
| | | |
|---|---|---|
| *F16D 65/18* | (2006.01) | |
| *F16D 55/226* | (2006.01) | |
| *F16D 65/00* | (2006.01) | |
| F16D 121/24 | (2012.01) | |
| F16D 125/42 | (2012.01) | |
| F16D 125/52 | (2012.01) | |

(52) U.S. Cl.
CPC ......... *F16D 65/183* (2013.01); *F16D 55/226* (2013.01); *F16D 65/0068* (2013.01); *F16D 2121/24* (2013.01); *F16D 2125/42* (2013.01); *F16D 2125/52* (2013.01)

(58) Field of Classification Search
CPC .......................... F16D 2125/42; F16D 2125/52
See application file for complete search history.

(56) References Cited

U.S. PATENT DOCUMENTS

| | | | | |
|---|---|---|---|---|
| 2012/0292141 A1* | 11/2012 | Takahashi | ............... | F16D 65/18 |
| | | | | 188/72.3 |
| 2017/0097059 A1* | 4/2017 | Jung | ....................... | F16D 65/18 |
| 2020/0049215 A1* | 2/2020 | Song | ..................... | F16D 65/18 |

FOREIGN PATENT DOCUMENTS

| | | | | | |
|---|---|---|---|---|---|
| DE | 102018001328 A1 | * | 8/2018 | .......... | F16D 55/226 |
| KR | 10-1041553 B1 | | 6/2011 | | |
| WO | WO-2007051809 A1 | * | 5/2007 | ............. | F16D 65/18 |
| WO | WO-2016041327 A1 | * | 3/2016 | ............. | F04C 18/084 |
| WO | WO-2020122325 A1 | * | 6/2020 | ............. | B60T 13/741 |

* cited by examiner

*Primary Examiner* — Melody M Burch
(74) *Attorney, Agent, or Firm* — Morgan, Lewis & Bockius LLP

(57) ABSTRACT

Provided is a brake apparatus for a vehicle including a pair of brake pads that are disposed to face each other on a caliper body and disposed on two sides of a wheel disc, respectively, a first worm shaft part that is connected to a motor part, a first worm wheel part that is engaged with the first worm shaft part and rotates with rotation of the first worm shaft part, a second worm shaft part that is connected to the first worm wheel part and rotates together with the first worm wheel part, a second worm wheel part that is engaged with the second worm shaft part and includes a plurality of second gear teeth, and a linear motion conversion unit that is coupled to the second worm wheel part and converts a rotational motion of the second worm wheel part into a linear motion.

7 Claims, 10 Drawing Sheets

BRAKE APPARATUS FOR VEHICLE

CROSS-REFERENCE TO RELATED APPLICATION

This application claims the benefit under 35 U.S.C. § 119(a) of priority to Korean Patent Application No. 10-2021-0011496 filed on Jan. 27, 2021 in the Korean Intellectual Property Office, the entire disclosure of which is incorporated herein by reference for all purposes.

BACKGROUND

Technical Field

Exemplary embodiments of the present disclosure relate to a brake apparatus for a vehicle, and more particularly, to a brake apparatus for a vehicle, which can withstand a heavy load during operation and can be mass-produced through mold manufacturing.

Discussion of the Background

In general, in an electronic parking brake (EPB) of a vehicle, an actuator device converts a rotational force of a driving motor into a linear motion by using a screw and a nut mechanism together with a gear module unit and presses a piston. The pressed piston presses a brake pad, which is a friction material, to a wheel disc, thereby generating a braking force.

The gear module unit of the actuator device applied to the electronic parking brake in the related art includes a worm shaft connected to a rotating shaft of the driving motor and a worm wheel engaged with a first worm shaft. A gear of the worm wheel is a crossed helical gear having a flat cross-section or an enveloping gear having a concave cross-section.

However, the gear of the worm wheel that is the crossed helical gear having a flat cross-section can be mass-produced through mold manufacturing, but has low rigidity and durability low because a contact area of the worm shaft with the gear is relatively small. Furthermore, the gear of the worm wheel that is the enveloping gear having a concave cross-section has high rigidity and durability because the contact area of the worm shaft with the gear is relatively large, but mass production of the gear is difficult because of difficulty in mold manufacturing. Therefore, there is a need for solving the above problems.

The background art of the present disclosure is disclosed in Korean Patent No. 10-1041553 (registered on Jun. 8, 2011 and entitled "Electronic Parking Brake Actuator").

SUMMARY

The present disclosure has been made to solve the above problems, and an object of the present disclosure is to provide a brake apparatus for a vehicle, which can withstand a heavy load during operation and can be mass-produced through mold manufacturing.

In order to solve the above problems, a brake apparatus for a vehicle in accordance with the present disclosure includes: a pair of brake pads that are disposed to face each other on a caliper body and disposed on two sides of a wheel disc, respectively; a first worm shaft part that is connected to a motor part and located inside a housing part; a first worm wheel part that is located inside the housing part, is engaged with the first worm shaft part, and rotates with rotation of the first worm shaft part; a second worm shaft part that is located inside the housing part, is connected to the first worm wheel part, and rotates together with the first worm wheel part when the first worm wheel part rotates; a second worm wheel part that is engaged with the second worm shaft part, and includes a plurality of second gear teeth each including a second enveloping gear tooth portion having a second inclined portion that increases in height toward one end side from a center portion and a second helical gear tooth portion having a constant height from the center portion to another end side; and a linear motion conversion unit that is coupled to the second worm wheel part, converts a rotational motion of the second worm wheel part into a linear motion, and is able to press any one of the pair of brake pads.

Furthermore, the second worm wheel part may include a second worm wheel body that is engaged with the second worm shaft part, and the plurality of second gear teeth that are formed to be spaced apart from one another along an outer peripheral portion of the second worm wheel body, and are each provided with the second enveloping gear tooth portion and the second helical gear tooth portion.

Furthermore, the second enveloping gear tooth portion may be located on a side away from an axial force direction of the second worm wheel body on the second worm wheel body.

Furthermore, the first worm wheel part may include a plurality of first gear teeth engaged with the first worm shaft part, each including a first enveloping gear tooth portion having a first inclined portion that increases in height toward one end side from a center portion and a first helical gear tooth portion having a constant height from the center portion to another end side.

Furthermore, the first worm wheel part may include a first worm wheel body that has a center portion to which the first worm shaft part is coupled, and the plurality of first gear teeth that are formed to be spaced apart from one another along an outer peripheral portion of the first worm wheel body, and are each provided with the first enveloping gear tooth portion and the first helical gear tooth portion.

Furthermore, the first enveloping gear tooth portion may be located on a side away from an axial force direction of the first worm wheel body on the first worm wheel body.

Furthermore, the brake apparatus for a vehicle may further include a bearing part that is located inside the housing part, surrounds the second worm shaft part, and supports the rotation of the second worm shaft part.

According to a brake apparatus for a vehicle in accordance with the present disclosure, at least one of a plurality of worm wheels may include a plurality of gear teeth each including an enveloping gear tooth and a helical gear tooth and be in surface contact with a worm shaft during operation. Therefore, the rigidity of the worm wheel and the worm shaft may be improved because the worm wheel is able to withstand a heavy load, which makes it possible to substantially prevent the worm shaft from being damaged, and enables mass production through mold manufacturing.

DETAILED DESCRIPTION OF THE ILLUSTRATED EMBODIMENTS

Figure 1:
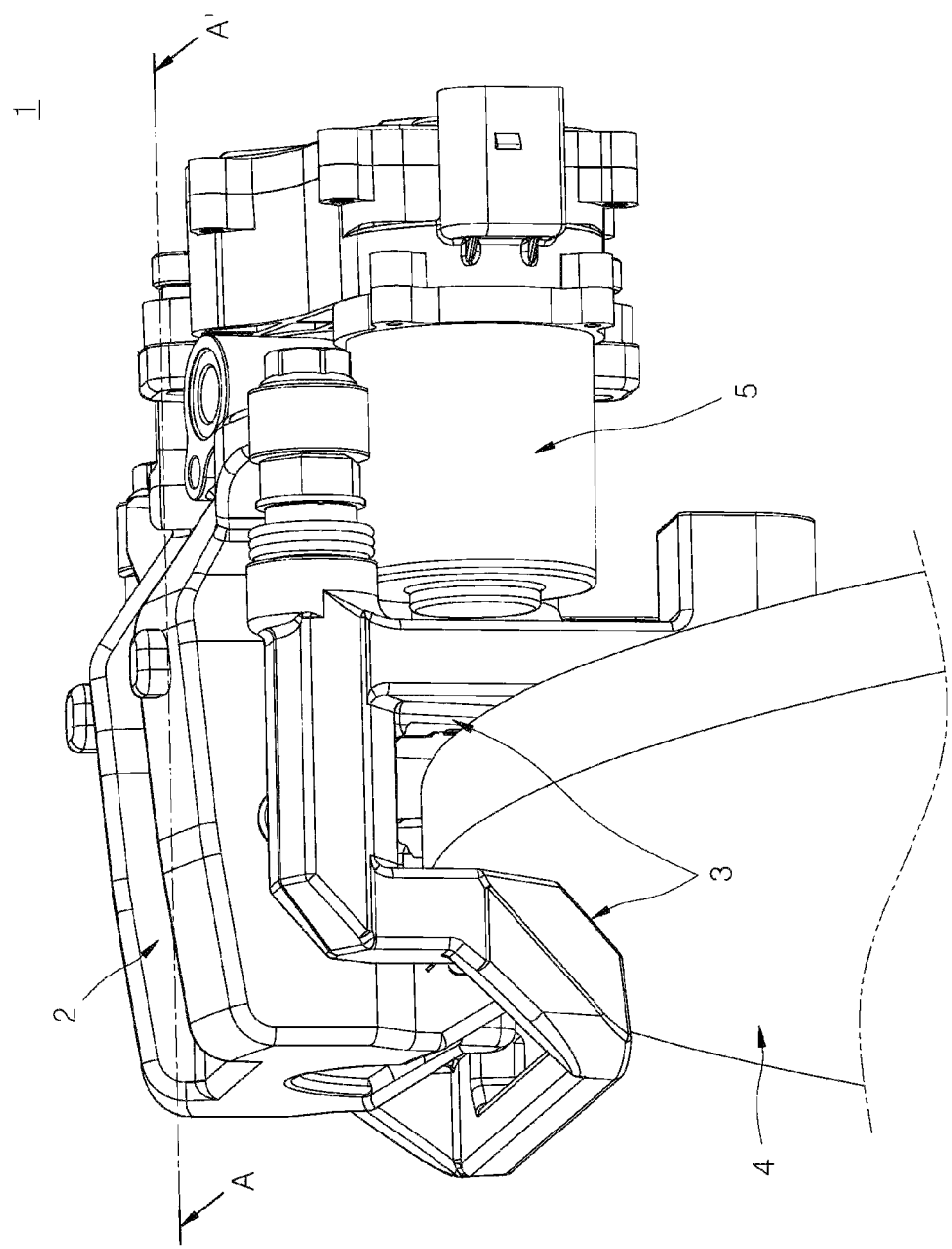
FIG. 1 is a view illustrating a vehicle brake apparatus in accordance with an embodiment of the present disclosure.

Hereinafter, an actuator device for a vehicle brake in accordance with an embodiment of the present disclosure will be described with reference to the accompanying drawings.

In this process, the thicknesses of lines or the sizes of elements illustrated in the drawings may be exaggerated for the purpose of clarity and convenience of explanation. Furthermore, terms to be described later are terms defined in consideration of functions thereof in the present disclosure and may be changed according to the intention of a user or an operator, or practice. Accordingly, such terms should be defined based on the disclosure over the present specification.

Figure 2:
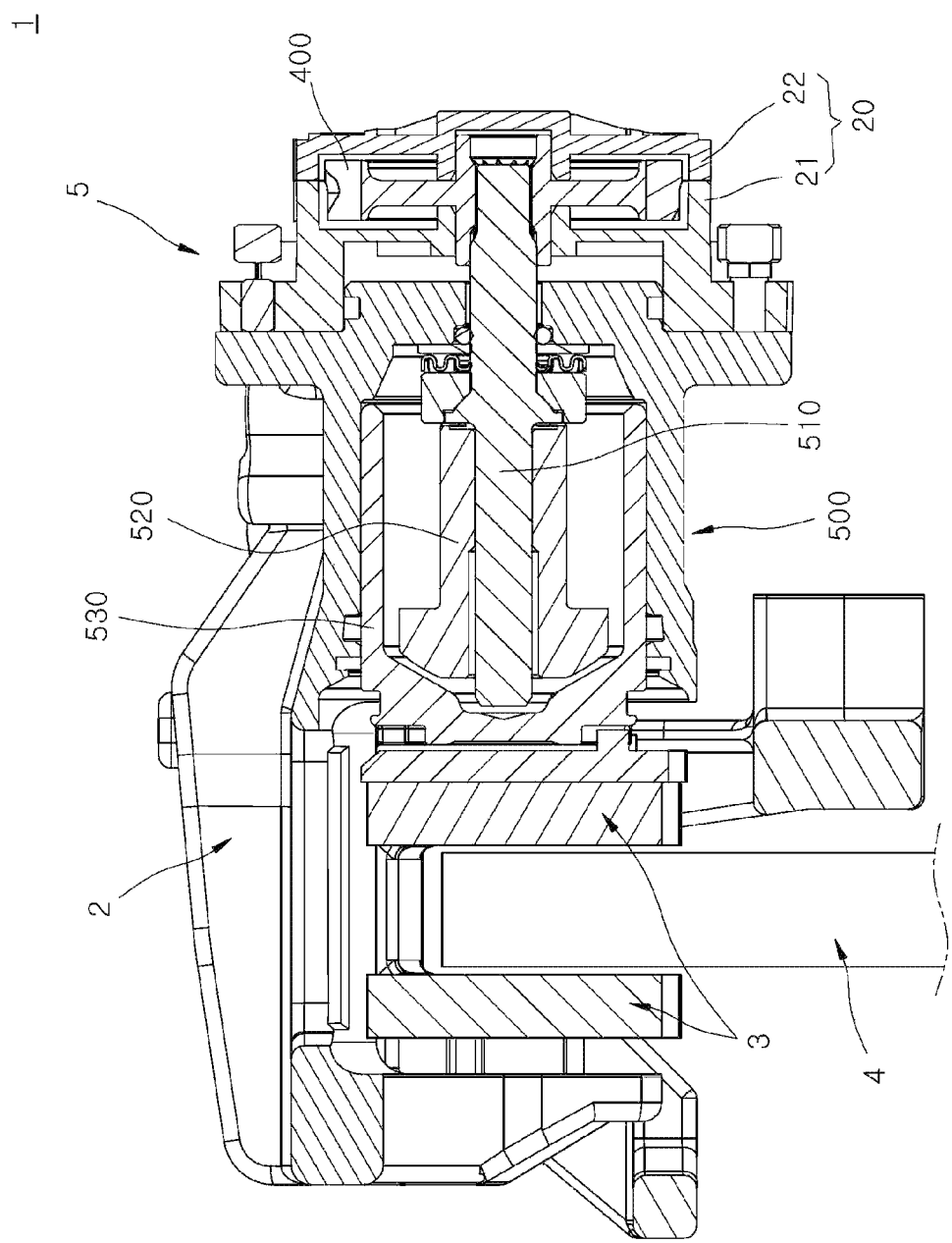
FIG. 2 is a cross-sectional view taken along line A-A' in FIG. 1.
Figure 3:
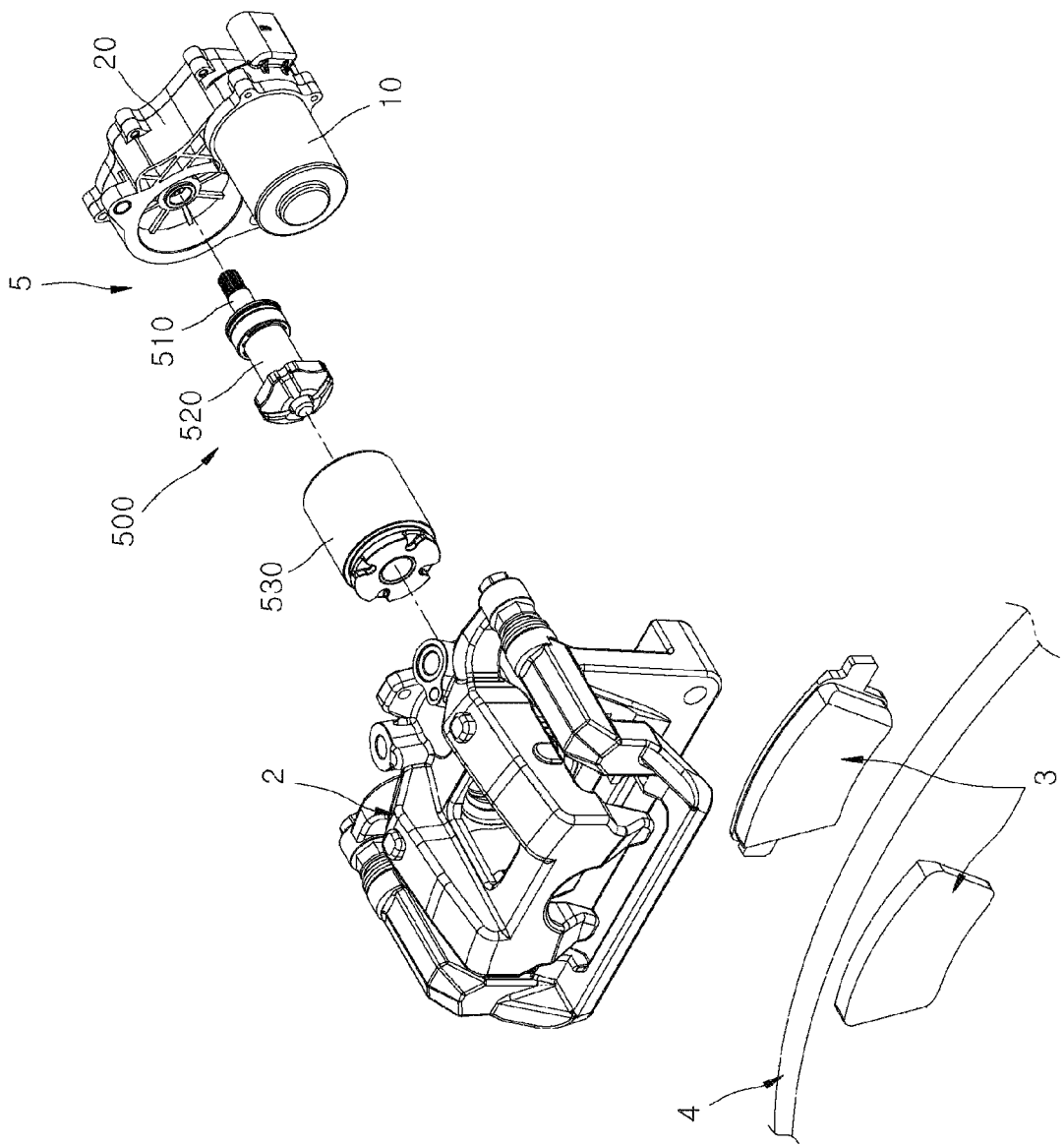
FIG. 3 is an exploded perspective view of the vehicle brake apparatus in accordance with an embodiment of the present disclosure.
Figure 4:
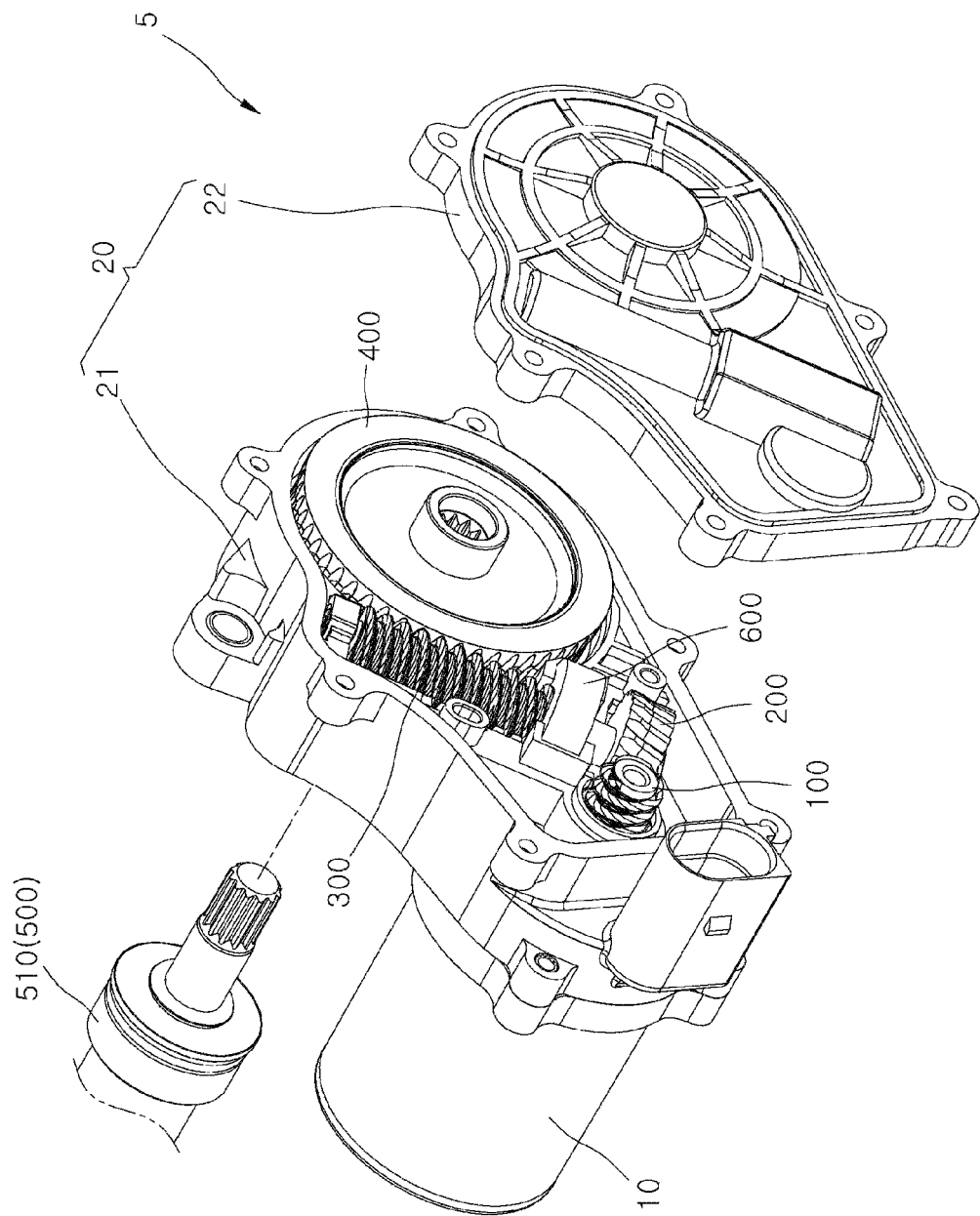
FIG. 4 is an enlarged view of an actuator device for a vehicle brake in accordance with an embodiment of the present disclosure.
Figure 5:
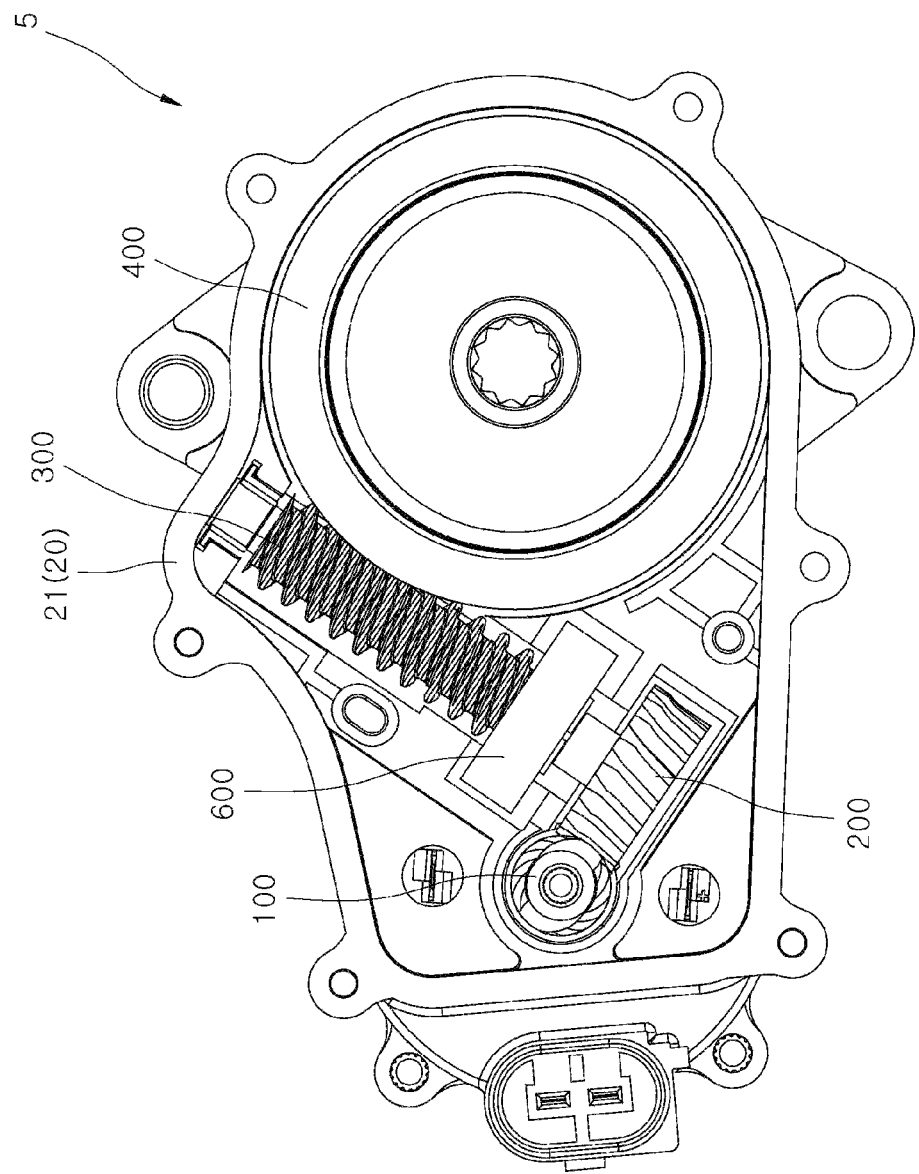
FIG. 5 is a front view of FIG. 4.
Figure 6:
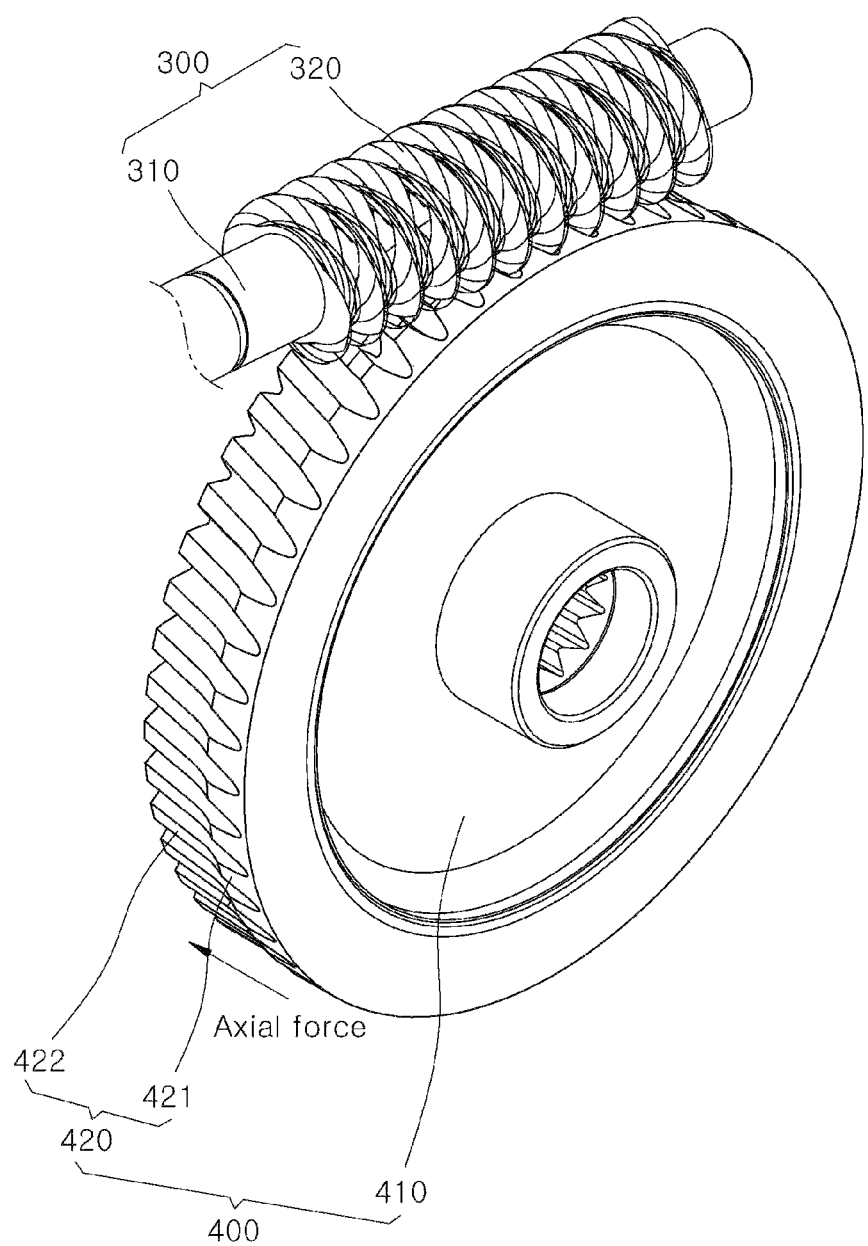
FIG. 6 is an enlarged view of a second worm shaft part and a second worm wheel part of the actuator device for a vehicle brake in accordance with an embodiment of the present disclosure.
Figure 7:
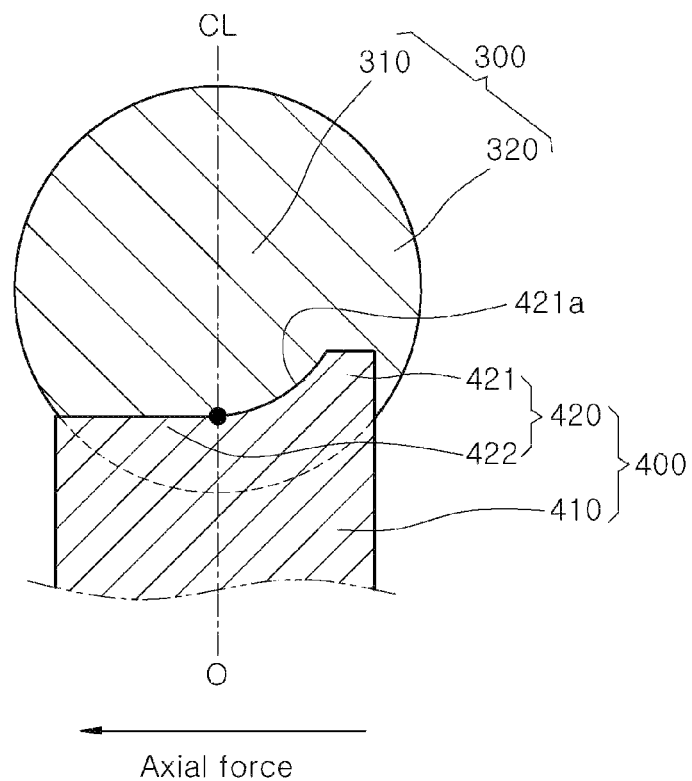
FIG. 7 is a cross-sectional view of main components of FIG. 6.
Figure 8:
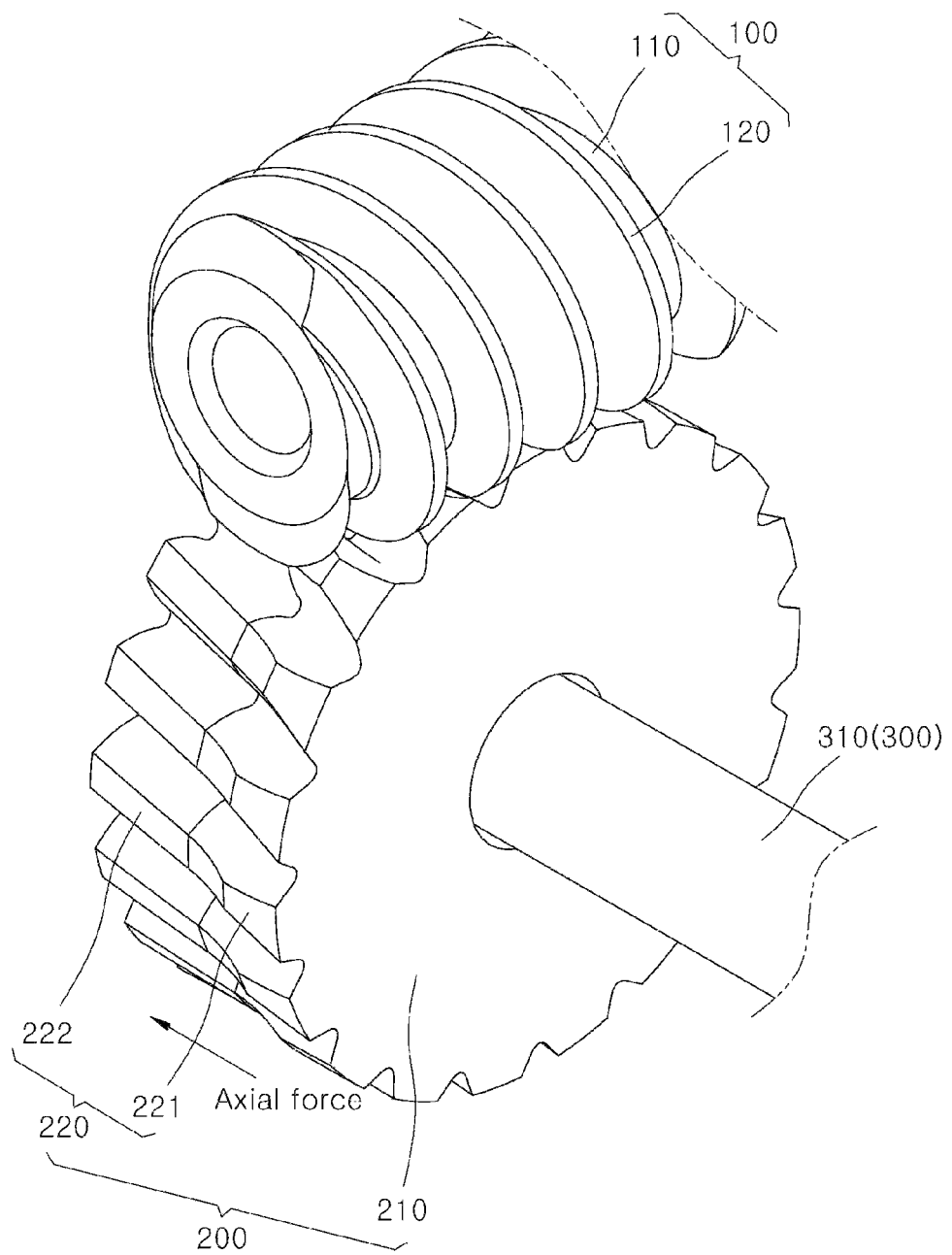
FIG. 8 is an enlarged view of a first worm shaft part and a first worm wheel part of the actuator device for a vehicle brake in accordance with an embodiment of the present disclosure.
Figure 9:
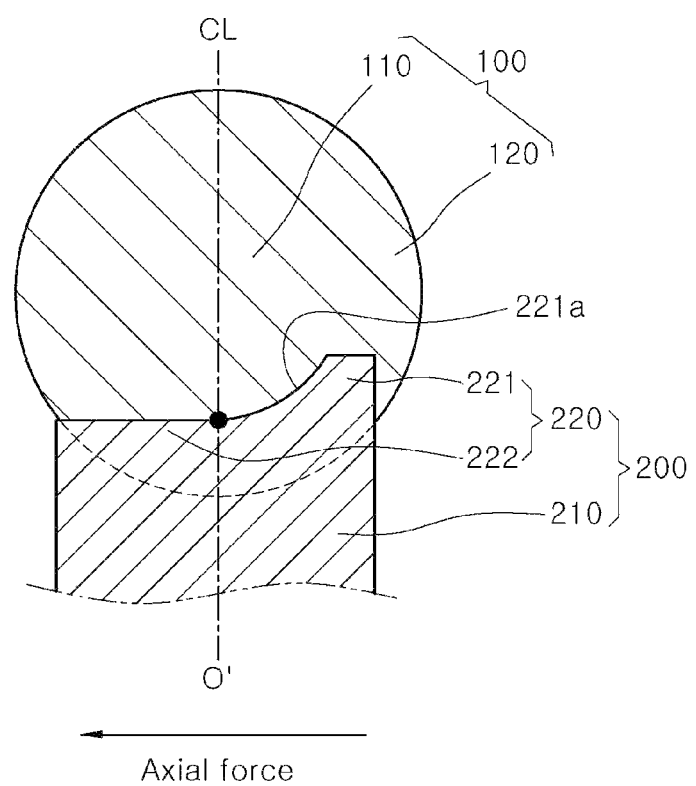
FIG. 9 is a cross-sectional view of main components of FIG. 8.
Figure 10:
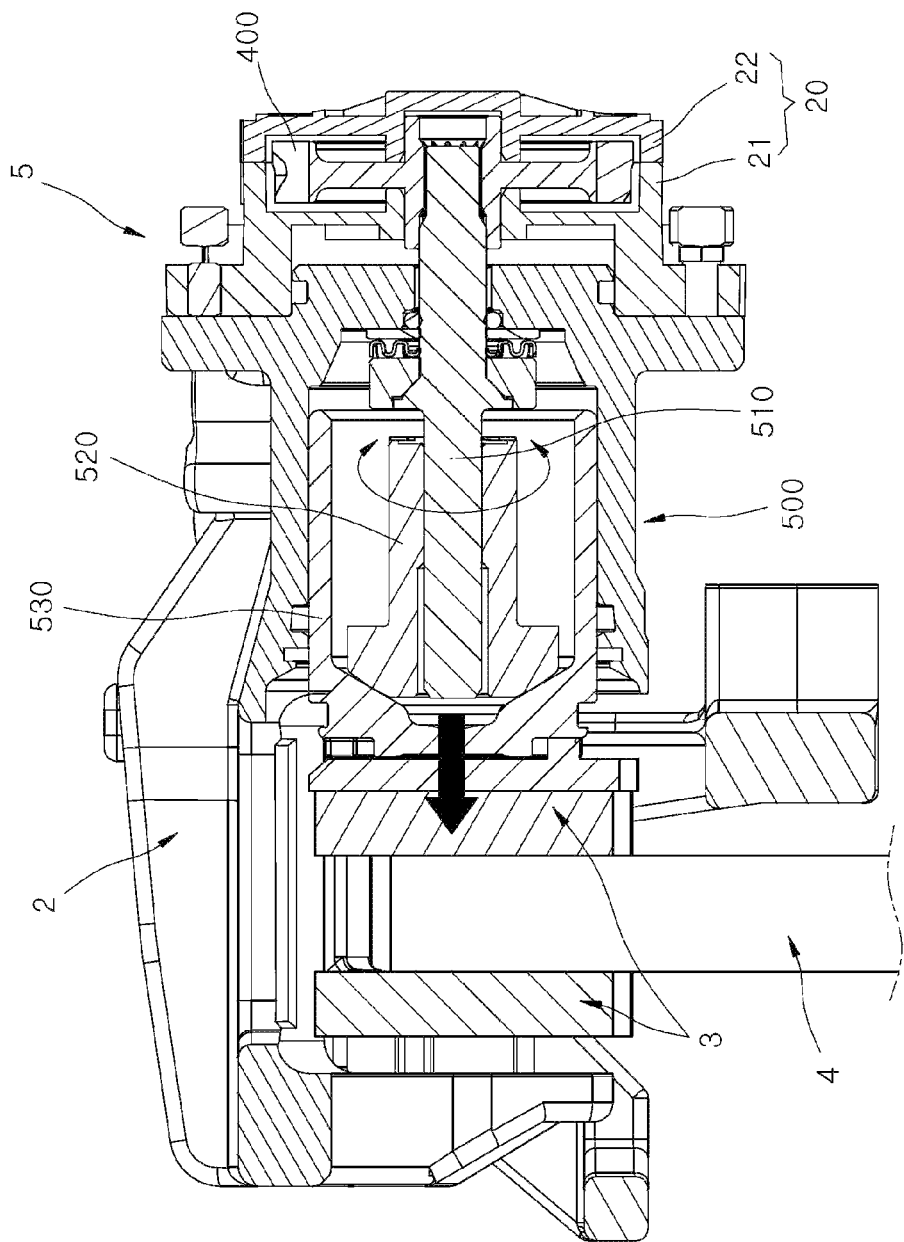
FIG. 10 is a view illustrating an operation of the actuator device for the vehicle brake.

FIG. 1 is a view illustrating a vehicle brake apparatus in accordance with an embodiment of the present disclosure, FIG. 2 is a cross-sectional view taken along line A-A' in FIG. 1, FIG. 3 is an exploded perspective view of the vehicle brake apparatus in accordance with an embodiment of the present disclosure, FIG. 4 is an enlarged view of an actuator device for a vehicle brake in accordance with an embodiment of the present disclosure, FIG. 5 is a front view of FIG. 4, FIG. 6 is an enlarged view of a second worm shaft part and a second worm wheel part of the actuator device for a vehicle brake in accordance with an embodiment of the present disclosure, FIG. 7 is a cross-sectional view of main components of FIG. 6, FIG. 8 is an enlarged view of a first worm shaft part and a first worm wheel part of the actuator device for a vehicle brake in accordance with an embodiment of the present disclosure, FIG. 9 is a cross-sectional view of main components of FIG. 8, and FIG. 10 is a view illustrating an operation of the actuator device for the vehicle brake.

Referring to FIG. 1 to FIG. 3, a vehicle brake apparatus 1 in accordance with an embodiment of the present disclosure includes a caliper body 2, brake pads 3, a wheel disc 4, and an actuator device 5 for a vehicle brake.

The brake pads 3 are provides as a pair and disposed to face each other on the caliper body 2, and are disposed on two opposing sides of the wheel disc 4, respectively. The actuator device 5 for a vehicle brake is installed on the caliper body 2 and is operated to press the brake pads 3 or to release the pressure to the brake pads 3. At this time, when the brake pads 3 are pressed by the actuator device 5 for a vehicle brake, the brake pads 3 are moved toward the wheel disc 4 and are pressed against the wheel disc 4, so that a braking force is generated. However, when the brake pads 3 is released from pressure by the actuator device 5 for a vehicle brake, the brake pads 3 are moved toward an opposite side of the wheel disc 4 and are not brought into contact with the wheel disc 4, so that the braking force is released.

Referring to FIG. 4 to FIG. 10, the actuator device 5 for a vehicle brake in accordance with an embodiment of the present disclosure includes a motor part 10, a housing part 20, a first worm shaft part 100, a first worm wheel part 200, a second worm shaft part 300, a second worm wheel part 400, and a linear motion conversion unit 500. The first worm shaft part 100 is connected to the motor part 10 and is located inside the housing part 20. The housing part 20 includes a housing body 21 and a housing cover 22. The housing body 21 has one opened side, the motor part 10 is installed in the housing body 21, and the first worm shaft part 100 is located inside the housing body 21. The housing cover 22 is coupled to the housing body 21 to cover the one opened side. The first worm shaft part 100 is connected to a rotating shaft (not illustrated) of the motor part 10 and rotates by receiving power from the motor part 10.

The first worm shaft part 100 includes a first worm shaft body 110 and a plurality of first worm shaft gear teeth 120. The first worm shaft body 110 is connected to the rotating shaft of the motor part 10. The plurality of first worm shaft gear teeth 120 are formed to be spaced apart from one another along the outer peripheral portion of the first worm shaft body 110 and are engaged with first gear teeth 220 of the first worm wheel part 200.

The first worm wheel part 200 is located inside the housing part 20, is engaged with the first worm shaft part 100, and rotates with the rotation of the first worm shaft part 100. The first worm wheel part 200 is located in the housing body 21 of the housing part 20, rotates by receiving the rotational force of the first worm shaft part 100, and rotates the second worm shaft part 300 to be described below.

The second worm shaft part 300 is located inside the housing part 20, is connected to the first worm wheel part 200, and rotates together with the first worm wheel part 200 when the first worm wheel part 200 rotates. The second worm shaft part 300 is coupled to a center portion of the first worm wheel part 200 and is located in the housing body 21 of the housing part 20.

The second worm shaft part 300 includes a second worm shaft body 310 and a plurality of second worm shaft gear teeth 320. The second worm shaft body 310 is coupled to the center portion of the first worm wheel part 200 and is located in the housing body 21 of the housing part 20. The second worm shaft gear teeth 320 are formed to be spaced apart from one another along the outer peripheral portion of the second worm shaft body 310 and are engaged with a plurality of second gear teeth 420 of the second worm wheel part 400 to be described below.

The second worm wheel part 400 is engaged with the second worm shaft part 300 and includes the plurality of second gear teeth 420. The second gear tooth 420 includes a second enveloping gear tooth portion 421 and a second helical gear tooth portion 422. The second enveloping gear tooth portion 421 has a second inclined portion 421a that increases in height toward one end side from a center portion O. The second helical gear tooth portion 422 has a constant height from the center portion O to the other end side.

Specifically, the second worm wheel part 400 includes a second worm wheel body 410 and the plurality of second gear teeth 420. The second worm wheel body 410 is engaged with the second worm shaft part 300.

The plurality of second gear teeth 420 are formed to be spaced apart from one another along the outer peripheral portion of the second worm wheel body 410, and are each provided with the second enveloping gear tooth portion 421 and the second helical gear tooth portion 422. The second enveloping gear tooth portion 421 has the second inclined portion 421*a* that increases in height toward the one end side from the center portion O of the second worm wheel body 410. The second enveloping gear tooth portion 421 is located on a side away from the axial force direction of the second worm wheel body 410 on the second worm wheel body 410. The axial force direction is the same direction as a direction in which the linear motion conversion unit 500 to be described below is moved toward the brake pads 3 and is in close contact with the brake pads 3. The second helical gear tooth portion 422 has a constant height from the center portion O of the second worm wheel body 410 to the other end side.

As shown in FIG. 6 and FIG. 7, the second enveloping gear tooth portion 421 has the second inclined portion 421*a* that increases in height toward the right end in the drawing from a virtual reference line CL vertically passing through the center portion O of the second worm wheel body 410. The second helical gear tooth portion 422 has a constant height from the virtual reference line CL vertically passing through the center portion O of the second worm wheel body 410 to the left end in the drawing.

In this way, the second gear tooth 420 of the second worm wheel part 400 includes the second enveloping gear tooth portion 421 and the second helical gear tooth portion 422, and the second enveloping gear tooth portion 421 is located on the side away from the axial force direction of the second worm wheel body 410 and is in surface contact with the second worm shaft part 300, which makes it possible to improve the rigidity of the second worm shaft part 300 and the second worm wheel part 400 to substantially prevent the second worm shaft part 300 and the second worm wheel part 400 from being damaged, and enables mass production through mold manufacturing.

The first worm wheel part 200 is engaged with the first worm shaft part 100 and includes the plurality of first gear teeth 220. The first gear tooth 220 includes a first enveloping gear tooth portion 221 and a first helical gear tooth portion 222. The first enveloping gear tooth portion 221 has a first inclined portion 221*a* that increases in height toward one end side from a center portion O'. The first helical gear tooth portion 222 has a constant height from the center portion O' to the other end side.

Specifically, the first worm wheel part 200 includes a first worm wheel body 210 and the plurality of first gear teeth 220. The first worm wheel body 210 has a center portion to which the first worm shaft part 100 is coupled.

The plurality of first gear teeth 220 are formed to be spaced apart from one another along the outer peripheral portion of the first worm wheel body 210, and are each provided with the first enveloping gear tooth portion 221 and the first helical gear tooth portion 222. The first enveloping gear tooth portion 221 has the first inclined portion 221*a* that increases in height toward the one end side from the center portion O' of the first worm wheel body 210. The first enveloping gear tooth portion 221 is located on a side away from the axial force direction of the first worm wheel body 210 on the first worm wheel body 210. The axial force direction is the same direction as a direction in which the linear motion conversion unit 500 to be described below is moved toward the brake pads 3 and is in close contact with the brake pads 3. The first helical gear tooth portion 222 has a constant height from the center portion O' of the first worm wheel body 210 to the other end side.

As shown in FIG. 8 and FIG. 9, the first enveloping gear tooth portion 221 has the first inclined portion 221*a* that increases in height toward the right end in the drawing from the virtual reference line CL vertically passing through the center portion O' of the first worm wheel body 210. The first helical gear tooth portion 222 has a constant height from the virtual reference line CL vertically passing through the center portion O' of the first worm wheel body 210 to the left end in the drawing.

In this way, the first gear tooth 220 of the first worm wheel part 200 includes the first enveloping gear tooth portion 221 and the first helical gear tooth portion 222, and the first enveloping gear tooth portion 221 is located on the side away from the axial force direction of the first worm wheel body 210 and is in surface contact with the first worm shaft part 100, which makes it possible to improve the rigidity of the first worm shaft part 100 and the first worm wheel part 200 to substantially prevent the first worm shaft part 100 and the first worm wheel part 200 from being damaged, and enables mass production through mold manufacturing.

The linear motion conversion unit 500 is coupled to the second worm wheel part 400, converts the rotational motion of the second worm wheel part 400 into a linear motion, and can press any one of the pair of brake pads 3.

The linear motion conversion unit 500 is a device that converts the rotation of the second worm wheel part 400 into a linear motion, is moved toward the brake pads 3 along the rotation direction of the second worm wheel part 400 to press the brake pads 3, or is moved to an opposite side of the brake pads 3 not to press the brake pads 3.

The linear motion conversion unit 500 includes a screw bar part 510, a spindle part 520, and a piston part 530. The screw bar part 510 is located inside the caliper body 2, and rotates by receiving the rotational force of the second worm wheel part 400.

The spindle part 520 is linearly moved by the rotation of the screw bar part 510. The spindle part 520 is gear-connected to an outer side of the screw bar part 510, and is linearly moved by the rotation of the screw bar part 510. For example, the screw bar part 510 has a rod shape, is inserted into the spindle part 520, and is provided on the outer side thereof with a male thread (not illustrated). The spindle part 520 is provided on the inner side thereof with a female thread (not illustrated) engaged with the male thread, and the rotation of the spindle part 520 is restricted by the screw bar part 510. That is, the spindle part 520 may be moved in the left and right direction (see FIG. 10) according to the rotation of the screw bar part 510.

The piston part 530 is installed to surround the outer side of the spindle part 520, and is moved together with the spindle part 520 to press the brake pads 3. When the spindle part 520 presses the piston part 530, the piston part 530 presses the brake pads 3 and the brake pads 3 is pressed against the wheel disc 4, which makes it possible to generate a braking force. The piston part 530 in accordance with an embodiment is formed in a cylindrical shape, is opened in the direction in which the spindle part 520 is inserted, and has a shielded portion facing the brake pads 3.

A bearing part 600 is located inside the housing part 20, surrounds the second worm shaft part 300, and supports the rotation of the second worm shaft part 300.

It has been illustrated that, in the actuator device 5 for a vehicle brake in accordance with an embodiment of the present disclosure, a gear module unit including the first worm shaft part 100, the first worm wheel part 200, the second worm shaft part 300, and the second worm wheel part 400 is configured in one stage, and each of the first worm wheel part 200 and the second worm wheel part 400 includes a plurality of gear teeth each including an enveloping gear tooth and a helical gear tooth; however, the present disclosure is not limited thereto and the gear module unit may be configured in two stages in different situations, and may be varied in design so that at least one of a plurality of worm wheels provided in the gear module unit includes a plurality of gear teeth each including an enveloping gear tooth and a helical gear tooth.

Although the present disclosure has been described with reference to the embodiments illustrated in the drawings, the embodiments of the disclosure are for illustrative purposes only, and those skilled in the art will appreciate that various modifications and other equivalent embodiments are possible from the embodiments.

Thus, the true technical scope of the present disclosure should be defined by the following claims.

What is claimed is:

1. A brake apparatus for a vehicle, the brake apparatus comprising:
    a pair of brake pads that are disposed to face each other on a caliper body and disposed on two sides of a wheel disc, respectively;
    a first worm shaft part that is connected to a motor part and located inside a housing part;
    a first worm wheel part that is located inside the housing part, is engaged with the first worm shaft part, and rotates with rotation of the first worm shaft part;
    a second worm shaft part that is located inside the housing part, is connected to the first worm wheel part, and rotates together with the first worm wheel part when the first worm wheel part rotates;
    a second worm wheel part that is engaged with the second worm shaft part, and includes a plurality of second gear teeth each including a second enveloping gear tooth portion having a second inclined portion that increases in height toward one end side from a center portion thereof and a second helical gear tooth portion having a constant height from the center portion to another end side; and
    a linear motion conversion unit that is coupled to the second worm wheel part is configured to convert a rotational motion of the second worm wheel part into a linear motion and to press any one of the pair of brake pads.

2. The brake apparatus according to claim 1, wherein the second worm wheel part comprises:
    a second worm wheel body that is engaged with the second worm shaft part; and
    the plurality of second gear teeth that are spaced apart from one another along an outer peripheral portion of the second worm wheel body, and each include the second enveloping gear tooth portion and the second helical gear tooth portion.

3. The brake apparatus according to claim 2, wherein the second enveloping gear tooth portion is located on a side away from an axial force direction of the second worm wheel body on the second worm wheel body.

4. The brake apparatus according to claim 1, wherein the first worm wheel part includes a plurality of first gear teeth engaged with the first worm shaft part, each including a first enveloping gear tooth portion having a first inclined portion that increases in height toward one end side from a center portion thereof and a first helical gear tooth portion having a constant height from the center portion to another end side.

5. The brake apparatus according to claim 4, wherein the first worm wheel part further comprises:
    a first worm wheel body that has a center portion to which the first worm shaft part is coupled; and
    the plurality of first gear teeth that are spaced apart from one another along an outer peripheral portion of the first worm wheel body, and each include the first enveloping gear tooth portion and the first helical gear tooth portion.

6. The brake apparatus according to claim 5, wherein the first enveloping gear tooth portion is located on a side away from an axial force direction of the first worm wheel body on the first worm wheel body.

7. The brake apparatus according to claim 1, further comprising:
    a bearing part that is located inside the housing part, surrounds the second worm shaft part, and is configured to support the rotation of the second worm shaft part.

* * * * *